No Printed Specification Available
8755X
N. Sawyer,
Brick Machine.
Patented Apr. 8, 1835.
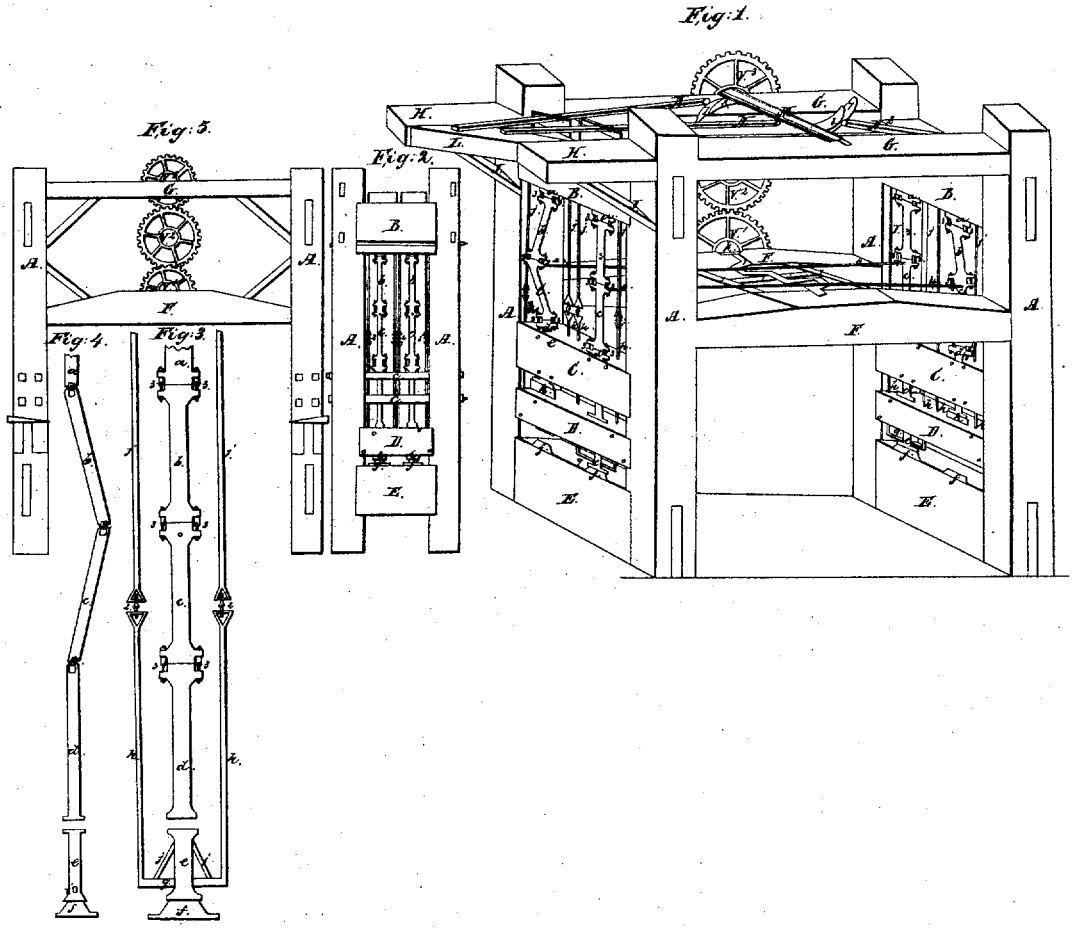
AM. PHOTO-LITHO. CO. N.Y. (OSBORNE'S PROCESS.)

Nathan Sawyer 8755X
Letters Patent

The Schedule referred to in these Letters Patent and making part of the same containing a description in the words of the said Nathan Sawyer himself of his improvement in the machine for pressing brick from dry clay ——

To all whom it may concern. Be it known that I Nathan Sawyer of Mount Vernon in the County of Knox and State of Ohio have invented certain improvements in the machine for pressing brick from dry clay and I do hereby declare that the following is a full and exact description thereof. The frame work of this machine and many of its individual parts may be altered in form proportion and arrangement, in referring to the accompanying drawings. therefore I do not intend to limit myself in these particulars but only to give a clear exemplification of the principles upon which I proceed and to exhibit what I consider a good practical mode of carrying this principle into effect. The proportions of the respective parts which are designated in the drawings are such as I have found to answer well in practice —

Fig 1st exhibits one of my machines in perspective. The pressure is made by means of those progressive levers usually denominated the toggle joint and provision is made for pressing four bricks in succession. two at each end. and although the number may be varied I am convinced that this will be found most advantageous in operating with one machine. A A Fig 1. represents the four corner posts into which the end cap pieces B. B. and the sills K. K. are strongly framed. G. G. are side plates and serve to support part of the machinery to be presently described. E E are two side pieces of timber on which the crank shaft is sustained. H.H. I. are projecting pieces constituting a part of of the frame upon which certain levers described hereafter are sustained. a. a. are the head pieces. forming a part of the upper hinge of the toggle joints or progressive levers b.b.c.c. d.d. are piston rods which are worked up and down by the motion of the toggle joints. on the lower ends e.e. of these rods are the pistons by which the pressure is made on the upper surface of the brick. The joints of the progressive levers are kept together by connecting links 3.3.3.3. which whilst they prevent the separation of their bearings admit of their moving with perfect freedom. C. C. are the guide clamps which in this fig are represented as made of wood framed or otherwise secured into the posts A A. within this are contained the boxes or sockets. which serve to guide the piston rods d.d. and cause the piston to enter correctly into the moulds. It is better however to make these guides clamps of iron. and they are represented at C.C. fig 2. which is a direct end view of the machine on a smaller scale than fig 1. D.D. are the mould clamps, made of wood and boxed or otherwise attached to the posts A.A. the moulds to be presently described stand within these clamps which are so excavated or formed as to receive and retain them. The moulds I make of cast iron sometimes casting them in one entire piece and at others in four pieces which are joined together at each angle and retained in their places by iron hoops on the outside of the mould. The depth of the mould is usually about seven inches at the ends but one inch less at the shallowest part, its length and breadth on the inside is that of the brick that is to be formed in it. The inside I line with plates of steel. which I rivet through the cast iron. The mould is oval on its outside, and is somewhat larger at the bottom than at the top for the purpose of driving on wrought iron hoops or bands to strengthen it. The cast iron measures about two and a half inches through at the swell of the oval, and about one inch at each angle angle. The sides of the mould are made concave on the upper edge.
the concavity commencing about one inch from the end of its
interior and descending in the middle about an inch. the inten-
tion of this will be presently explained. e.e. Fig. 1.2.3&4. are
the brick dischargers. their upper ends enter the lower side
of the mould and form its bottom for which purpose they are
of the same size with the piston by which the clay is pressed
each of them fitting accurately into and being capable of sliding
through the mould. These lifters whilst the brick is being
pressed rests upon iron foot blocks f.f. which stand firmly
on the sills E.E. when one of the piston rises by the action of
the toggle, the lifter also rises. lifting the brick up so that
it may be removed from the mould. The power to work
the press is communicated through the medium of the cranks
upon the crank shaft X. which turns in suitable boxes on
the timbers F.F. Upon this shaft there are two cranks standing
at right angles to each other and each of these cranks
works two pitmen or shackle bars attached to their corres-
ponding progressive levers or toggle joints at opposite
ends of the machine. In order to give the proper motion
to the toggle joints the throw out of each crank is about
eight and a half inches. By this arrangement the
bricks are pressed in succession and the machine worked
to the greatest advantage. M. is a cam shaft intended
to raise the lifters above described and this cam shaft
is turned by a system of wheels receiving there motion
from the crank shaft. These wheels are marked V1. V2 and
V3. the first of them being on one end of the crank
shaft and the last upon the cam shaft. that marked V2.
being intermediate between them They are in the drawings
fig 1 and 5. represented as standing, with their axis in
the same vertical line, but if it is desired to lessen the height
of the machine. the intermediate wheel may be removed
out-

8755X out of this line and the first and last wheels brought nearer together; 7.8-7.8. are cams on the cam shaft which operate on four levers and through them on the four lifters. three of these levers are seen in the drawing fig. 1. marked N.O. N.O. and N.2: the two former have their fulcra on the projecting part of the frame L and at O.O. they, are attached to the lifting rods J.J. shown in figs 1&3. The cross piece g. fig. 3. passes through a hole in the foot of the lifter r and causes it to rise at the proper time for delivering the brick. The two levers at N2 are levers of the first kind having their fulcra between the power and the weight. as they are operated upon by the cams on their descent. Figs. 3&4 give a front and a side view of one of the toggle joints and its appendages. These and fig 5 it will be seen are drawn to a larger scale than fig. 1. When the machine is to be used the clay is prepared by closely pulverizing it and passing it through a screen, the meshes of which measure about one fourth of an inch thus reducing the lumps to a proper size and separating it from pebble stones. The moulds are to be filled by means of a spade and the superfluous material scraped off by its side. The hollows or concaves on the edges of the mould leave a large portion of the clay at each end than the middle, without which the bricks would be unsound at their angles, but by this provision they are rendered perfectly sound. Four bricks it will be seen are produced by every revolution of the crank shaft, and for ordinary brick it (may) perform six revolutions in a minute, but for the best kind four revolutions are as many as will be proper. The bricks as they are lifted (may) be either placed under a shed to dry or taken at once to the kiln, but they will be better if allowed to dry before they are baked. I do not claim as my invention, the progressive levers, the crank shaft or or the other parts of this machine separately or uncombined they having in general been previously known and used as elements of other machines. but what I do claim as my invention is that general combination and arrangement of the respective parts as herein described by which this machine is distinguished from all others that have been constructed for the same purpose. I also claim the giving to the mould such form as shall cause the material with which it is filled to be so much deeper in certain parts before it is pressed as will suffice to render the brick when pressed as dense and solid at the angles as it is at other parts whether this be effected precisely in the manner described or in any other in which a similar effect is produced by analagous means N. Sawyer.

Witnesses
Henry Bishop
Wm Bishop (Patented April 8. 1835.—)

Exd.
[illegible]

1584 words

See sketch with Mr Mc Intire (Drawing)